Aug. 14, 1945.    M. E. FOGLE    2,382,220
PHOTOCELL AND FILTER COMBINATION
Filed April 16, 1942
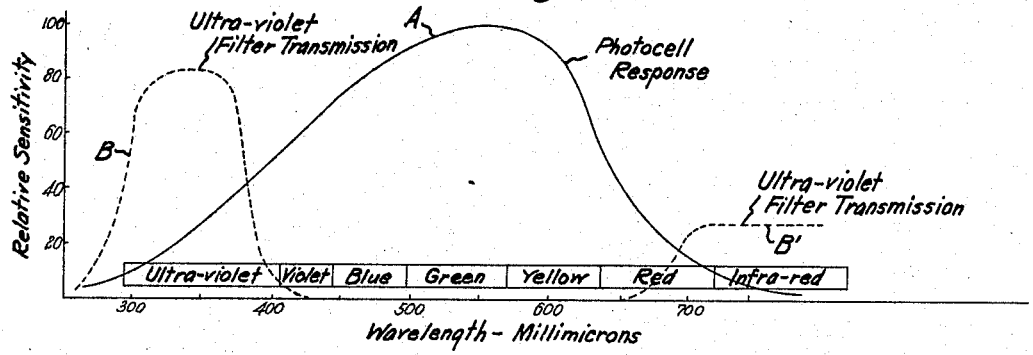
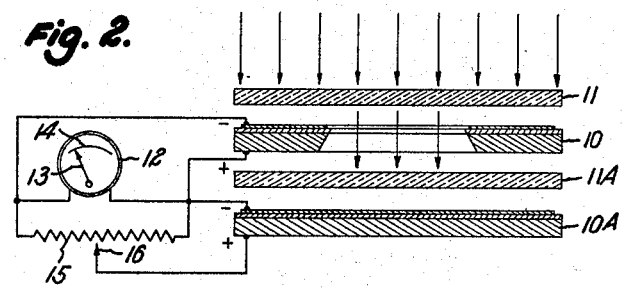
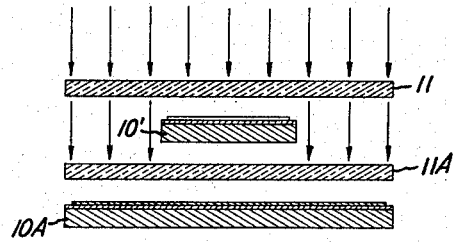
Inventor:
Marlin E. Fogle,
By Pierce & Scheffler,
Attorneys.

Patented Aug. 14, 1945

2,382,220

UNITED STATES PATENT OFFICE 2,382,220

PHOTOCELL AND FILTER COMBINATION

Marlin E. Fogle, Hillside, N. J., assignor to Weston Electrical Instrument Corporation, Newark, N. J., a corporation of New Jersey Application April 16, 1942, Serial No. 439,282

7 Claims. (Cl. 88—23)

This invention relates to a photometric system for measuring radiations in conformity to a desired spectral characteristic curve and more particularly to a combination of photocells provided with individual light filters and connected to a common electrical instrument in such manner that the instrument provides a measure of radiations in conformity to a desired spectral characteristic curve.

It is well known that a photocell possesses an inherent spectral sensitivity dependent upon the materials of which the cell is formed. To adapt the photocell to the measurement of radiations in conformity to a desired spectral characteristic curve, such as the sensitivity of the eye, of photographic emulsions, etc., it is necessary to modify the effective spectral sensitivity of the cell so that its current response conforms to the desired spectral characteristic curve. This can be accomplished by placing a light filter, having definite transmission characteristics, over the photocell. However, due to the difficulty of making filters which will transmit only the desired portion of the spectrum, to the exclusion of all others, such photocell and filter combinations have, to date, enjoyed only a limited field of usefulness. In other words, present filters do not possess desired characteristics without being encumbered by other undesirable characteristics. Certain filters, in order to adequately reduce the sensitiveness of the photocell with respect to one spectral range, also reduce the sensitiveness with respect to other spectral ranges. Other filters do not possess a sharp cut-off point and hence transmit light radiations corresponding to an undesired portion of the spectrum.

The usual method of combining filters is to superpose them over a photocell so that the light to be filtered passes through all, thereby adding the absorptive properties of each individual filter. This method is not entirely satisfactory, as it unduly reduces the total amount of light reaching the photocell necessitating the use of a very sensitive (and correspondingly delicate) instrument, and requires much experimentation in order to determine the correct thickness and spectral transmission of the individual filters which make up the combination.

It has been proposed to overcome the difficulty referred to by placing sectional filters of different individual characteristics over restricted portions of a photocell surface. This also is not entirely satisfactory as all portions of the photocell surface are not of the same spectral or electrical sensitivity. This defect is further exaggerated when, as is often the case, the entire surface of the photocell is not evenly illuminated by the light source under investigation. Further, such an arrangement does not permit compensation for an individual filter that absorbs radiations within the desired waveband.

The combination of separate photocells provided with individual filters and electrically connected together, in accordance with this invention, possesses many desirable advantages. By properly connecting the photocells, the effects of the individual filters may be either added or subtracted, as desired. Further, by preselection, it is possible to choose photocells that possess matched electrical and spectral characteristics. Still further, variations among the electrical characteristics of individual photocells may be compensated for by means of adjustable resistors forming part of the electrical circuit or by an opaque mask placed over a portion of the active surface of the photocell having the higher sensitivity.

An object of this invention is to provide novel photoelectric cell and filter arrangements for combining the effects of a plurality of filters in either additive or subtractive relationship. An object is to provide photoelectric measuring apparatus and circuits for combining the effects of two or more filters that are independently subjected to light.

More specifically, an object is to provide a first photocell having a central opening therethrough, a filter over the photocell, and a second photocell also provided with a filter and positioned under the first photocell.

Still another specific object is to provide a small photocell with an overlapping filter, and a larger photocell also provided with a filter, the larger photocell being positioned under the smaller photocell and the photocells and filters being arranged in alternate sequence.

These and other objects and advantages will be apparent from the following description, when taken with the accompanying drawing in which:

Fig. 1 is a graph showing the spectral sensitivity of a photocell and the transmission characteristics of an ultra-violet filter;

Fig. 2 is a cross sectional view of an embodiment of the invention wherein the photocells and filters are arranged alternately in substantially axial alinement; and Fig. 3 is a cross sectional view illustrating another form of photocell-filter combination comparable to that shown in Fig. 2.

It is often desirable to measure the radiations or color composition of light sources for therapeutical or research purposes. Specifically, there exists a need for a photometric instrument that will accurately measure ultra-violet radiations for proper human dosage and thereby afford a control to prevent harmful overdoses. It is also desirable to measure radiations in conformity to a particular spectral sensitivity curve, such as, for example, the spectral sensitivity of a photographic emulsion, in order to determine the effect of a light source upon a film made of the particular emulsion.

The invention will be described in connection with a photometric device for measuring ultra-violet radiations but it will be understood that the same principles apply to the measurement of radiations within any desired region of the spectrum.

Referring now specifically to Figure 1, the solid line curve A represents the spectral sensitivity of a photo-voltaic or dry disc photoelectric cell. It will be noted that such a cell is appreciably sensitive to ultra-violet, red and infra-red radiations. The dotted line curves B, B' represent the spectral transmission properties of an ultraviolet filter of high quality. Here it will be noted that such a filter has a relatively sharp cut-off in the region of 400 millimicrons, thereby preventing the transmission of most of the visible portion of the spectrum. However, the filter transmits some red and an appreciable portion of infra-red rays. It will be apparent that the current output of a photocell provided with such a filter will not afford a true indication of the ultra-violet radiations but will be too high as a result of the undesirable red and infra-red radiations transmitted by the filter, thereby resulting in a false measurement of the incident ultra-violet rays. While it is true that an approximate correction factor may be applied to the indicating instrument employed to measure the photocell output, such a procedure limits the utility of the device as a different correction factor must be provided for each different type of ultra-violet light source to be measured.

This invention makes it possible to construct an instrument which will be of universal utility to the extent that no correction factor is necessary to determine, by direct measurement, the quantity of ultra-violet light emanating from any light source. An electrical method is employed to combine the effects of two or more filters so that their absorption or transmission properties may be added or subtracted, thereby confining the overall sensitiveness of the combination to a specific region of the spectrum.

Referring now to Fig. 2, the photocells 10, 10A are of the dry disc type having a spectral sensitivity corresponding to the curve A of Fig. 1, such cells being well known in the art. Photocell 10 has an opening therethrough and is provided with an ultra-violet filter 11 possessing transmission properties as indicated by the dotted curves B, B' of Fig. 1. As explained hereinabove, the filter 11 transmits a certain amount of red and infra-red rays, curve B', which cause the photocell 10 to produce a current output that is in excess of the current output due to ultra-violet radiations. For purposes of clarity, let it be assumed that the total current output of photocell 10 is made up of 90 microamperes due to ultra-violet radiations and 10 microamperes due to red and infra-red radiations. The photocell 10A is arranged below the apertured photocell 10 and a filter 11A which is specifically designed to possess transmission properties corresponding to the dotted curve B' which lies in the red and infra-red region. To compensate for the transmission of filter 11, the current output of photocell 10A should be 10 microamperes, resulting entirely from the red and infra-red rays. The two photocells are so connected that their currents oppose each other across the indicating instrument 12 which may be of the permanent magnet, movable coil type provided with a pointer 13 and a scale 14, and the two photocells are positioned in superposed or stacked arrangement to be equally affected by the light rays which are indicated by the arrows. Inasmuch as the photocells are electrically connected in opposition, the deflection of pointer 13 will be directly proportional to the difference between the current outputs of the two photocells. Variations in the electrical sensitivities of the photocells may be compensated by masking off a part of the photocell of higher sensitivity, as is well known in the art, or by providing adjustable resistors for regulating the current input to the instrument from one or both of the photocells.

As illustrated in Fig. 2, a resistance 15 is shunted across the instrument 12 and one terminal of the photocell 10A is connected to a tap 16 that is slidable along the resistor 15 to adjust the effective current contribution of photocell 10A to the value corresponding to the undesired current component developed by the photocell 10. The balancing of the photocells is done at the time the instrument is calibrated and remains constant thereafter. When the apparatus is suitably adjusted or calibrated, the photocell 10 produces a current output of 90+10 microamperes in one direction and photocell 10A produces a current output of 10 microamperes in a reverse direction. Instrument 12, therefore, will indicate 90 microamperes, which represents the true value of the ultra-violet component of the light source under investigation. It will now be apparent that such a combination may be made into a universal instrument for the direct measurement, without application of correction factors, of the ultra-violet component of any light source.

By selecting filters with appropriate spectral transmission properties and by proper electrical connection of the photocells and measuring instrument, it is possible to produce a combination which will be responsive to any selected region or regions of the light spectrum. More than two photocells and filters may be required in some instances to match the net measured current to a desired spectral characteristic curve and the current contributions of the individual photocells may be additive when the primary filter attenuates some of the radiant energy that is to be measured.

The series stacking of the filters and photocells results in a small, compact, light target. In fact, such a target may be combined with the indicating instrument to produce a portable, accurate, measuring device. The device may be calibrated under any suitable and convenient light source and the calibration will hold for any other type of light source. Simplicity of operation and accuracy of measurement form inherent features of the device.

The invention is not limited to a single, central opening as shown in the photocell 10, as this photocell may be provided with a plurality of smaller holes. Such a multiple hole construction has the advantage of neutralizing possible differences in the response of various portions of the active photocell surface.

A further modification of the stacked or series arrangement is illustrated in Figure 3, wherein the primary photocell 10' is of reduced size, permitting passage of light rays around the periphery of the photocell 23' to the compensating photocell 10A.

The representative, spectral sensitivity curve herein illustrated and described has been chosen with a view toward simplicity and clarity of description. However, it is apparent that the same principles may be applied to provide a photometric device for measuring radiations in conformity to any spectral characteristic curve. A multiplicity of photocell and filter combinations may be necessary to provide a final instrument indication in conformity to a still more complex characteristic curve than that shown. Such multiple combinations may include photocells having an inherent spectral sensitivity of desired form and, therefore, these cells need not be provided with separate, individual light filters. Further, the absolute response of a photocell and filter combination, having a desired relative spectral sensitivity, may be greater than required at specific wavelengths but this may readily be compensated by connecting a resistance across the photocell having the higher output. Or, alternatively, the active surface area of the higher output photocell may be reduced as by use of a diaphragm, opaque baffle, neutral density filter, or the like.

It is to be noted that the spectral sensitivities of the photocell and of various photographic emulsions extend beyond the visible waveband. Hence, the use of the terms "radiations," "light spectrum," "spectral regions," etc., is not to be restricted but should be considered as broadly applying to any radiations within the spectral range to which the photocell is responsive.

The dry-disc type of photocell is admirably suitable for use in portable, photometric devices as it is small, and flat; requires no biasing potential; and possesses a long life. However, the invention is not limited to the use of any particular type of photosensitive device as the vacuum type phototube is also suitable for use in the practice of the invention.

Having particularly described the invention in terms of several specific embodiments, it will now be apparent, to those skilled in the art, that certain variations and modifications may be made without departing from the spirit and scope of the invention as set forth in the claims.

I claim:

1. In a photometric measuring apparatus, a pair of photocells in superposed arrangement, the lower cell extending beyond the upper cell, a filter over the upper cell in the path of all light rays that may reach the cells, and a second filter between said cells in the path of all rays that may reach the lower cell, whereby a part of the light rays approaching the assembly pass to the lower cell through the filters in series.

2. The invention as recited in claim 1, wherein the said upper cell is apertured to permit light rays to reach the lower cell.

3. The invention as recited in claim 1, wherein the said upper cell is provided with a single opening through which light rays may pass to reach the lower cell.

4. The invention as recited in claim 1, wherein the said upper cell is smaller than the lower cell.

5. A photometric device for measuring radiations within a desired region of the spectrum, said device comprising an upper photocell and associated light filter, a lower photocell extending beyond the upper cell and having an associated light filter, said cells and filter arranged in superposed and alternate sequence, whereby radiations which strike the lower cell pass through both light filters in series, a measuring instrument, and a circuit connecting the photocells to the instrument in opposed relation.

6. The invention as recited in claim 5, in combination with means for controlling the relative current outputs of the respective cells.

7. The invention as recited in claim 5, in combination with a resistance connected to at least one of said photocells for controlling the relative current outputs of the respective cells.

MARLIN E. FOGLE.